(12) United States Patent
Fan et al.

(10) Patent No.: US 10,995,618 B2
(45) Date of Patent: May 4, 2021

(54) CONTROL DEVICE TO ACHIEVE VARIABLE COMPRESSION RATIO FOR TRIANGLE ROTARY ENGINE

(71) Applicant: Jiangsu University, Jiangsu (CN)

(72) Inventors: Baowei Fan, Jiangsu (CN); Jianfeng Pan, Jiangsu (CN); Yao Lu, Jiangsu (CN); Wei Chen, Jiangsu (CN)

(73) Assignee: Jiangsu University, Jiangsu (CN)

( * ) Notice: Subject to any disclaimer, the term of this patent is extended or adjusted under 35 U.S.C. 154(b) by 404 days.

(21) Appl. No.: 15/749,461

(22) PCT Filed: May 17, 2017

(86) PCT No.: PCT/CN2017/084642
§ 371 (c)(1),
(2) Date: Jan. 31, 2018

(87) PCT Pub. No.: WO2018/103272
PCT Pub. Date: Jun. 14, 2018

(65) Prior Publication Data
US 2019/0010806 A1   Jan. 10, 2019

(30) Foreign Application Priority Data
Dec. 6, 2016   (CN) .......................... 201611107050.5

(51) Int. Cl.
*F03C 2/00*   (2006.01)
*F03C 4/00*   (2006.01)
(Continued)

(52) U.S. Cl.
CPC ................ *F01C 20/18* (2013.01); *F01C 1/22* (2013.01); *F01C 19/00* (2013.01); *F01C 20/20* (2013.01);
(Continued)

(58) Field of Classification Search
CPC .. F01C 1/22; F01C 20/18; F01C 20/20; F01C 19/00; F01C 21/00; F01C 21/08;
(Continued)

(56) References Cited

U.S. PATENT DOCUMENTS

| | | | | |
|---|---|---|---|---|
| 3,132,632 A | * | 5/1964 | Kehl | ........................ F01C 19/00 418/145 |
| 3,565,556 A | * | 2/1971 | Leas | ........................ F01C 19/10 418/16 |

(Continued)

FOREIGN PATENT DOCUMENTS

| | | |
|---|---|---|
| CN | 101270688 A | 9/2008 |
| CN | 101413436 A | 4/2009 |

(Continued)

*Primary Examiner* — Theresa Trieu
(74) *Attorney, Agent, or Firm* — Greenberg Traurig, LLP

(57) ABSTRACT

An actuator of a rotary engine that can realize different compression ratios includes three parts: an eccentric shaft, a triangle rotor and a control system. The eccentric shaft includes the front part of the eccentric shaft, the combination of an electric three-jaw and the rear part of the eccentric shaft. The triangle rotor includes the variable volume actuator, the front part of the rotor and the rear part of the rotor. The control system controls expansion and contraction of the electric three-jaw. The eccentric shaft part passes through the triangle rotor part to make the combination of electric three jaw to arrange in the annular groove. The reciprocating motion of the variable volume actuator is controlled by the expansion and contraction of the claw top of the electric three-jaw. Engine compression ratio may therefore be adjusted using the compression ratio adjustment system.

9 Claims, 4 Drawing Sheets

(51) Int. Cl.
*F04C 2/00* (2006.01)
*F01C 20/18* (2006.01)
*F02D 15/04* (2006.01)
*F02B 55/02* (2006.01)
*F01C 21/08* (2006.01)
*F01C 19/00* (2006.01)
*F01C 21/00* (2006.01)
*F01C 20/20* (2006.01)
*F01C 1/22* (2006.01)
*F02B 53/02* (2006.01)

(52) U.S. Cl.
CPC .............. *F01C 21/00* (2013.01); *F01C 21/08* (2013.01); *F02B 55/02* (2013.01); *F02D 15/04* (2013.01); *F01C 2021/1606* (2013.01); *F02B 53/02* (2013.01); *Y02T 10/12* (2013.01)

(58) Field of Classification Search
CPC .. F01C 2021/1606; F02D 15/04; Y02T 10/17; F02B 53/02; F02B 55/02; F02B 2053/005
USPC ........ 418/27, 61.2, 146, 148, 259, 266–268, 418/270
See application file for complete search history.

(56) References Cited

U.S. PATENT DOCUMENTS

| | | | | |
|---|---|---|---|---|
| 3,667,877 A | * | 6/1972 | Lamn | F01C 19/04 418/121 |
| 3,799,706 A | * | 3/1974 | Bilobran | F01C 1/22 418/61.2 |
| 3,920,359 A | * | 11/1975 | Gray | F01C 19/10 418/117 |
| 4,008,982 A | * | 2/1977 | Traut | F01C 1/104 418/24 |
| 4,664,609 A | * | 5/1987 | Kaneda | F01C 21/0809 418/137 |
| 4,692,104 A | * | 9/1987 | Hansen | F04C 2/32 418/61.1 |
| 5,381,877 A | | 1/1995 | Kobayashi | |
| 8,220,435 B2 | | 7/2012 | Shimizu | |

FOREIGN PATENT DOCUMENTS

| | | |
|---|---|---|
| CN | 106640387 A | 5/2017 |
| CN | 206267974 U | 6/2017 |

* cited by examiner

CONTROL DEVICE TO ACHIEVE VARIABLE COMPRESSION RATIO FOR TRIANGLE ROTARY ENGINE

CROSS REFERENCE TO RELATED APPLICATIONS

The present application is a 371 U.S. National Stage of International Application No. PCT/CN2017/084642, filed Aug. 17, 2016, entitled "A CONTROL DEVICE TO ACHIEVE VARIABLE COMPRESSION RATIO FOR TRIANGLE ROTARY ENGINE" which in turn claims priority to Chinese Application 201611107050.5 with the same title filed Jul. 26, 2016, both of which are incorporated herein by reference in its entirety.

TECHNICAL FIELD

The invention relates to the technical field of a dynamic mechanical system. Especially, the invention relates to an actuator that can achieve different compression ratios for rotary engine (Wankel engine).

BACKGROUND ART

The compression ratio is the ratio of the total cylinder volume to the combustion chamber volume of an engine. It is an important parameter used to control combustion, detonation and emission of an engine. It is also an important parameter in the design field of the internal combustion engine. Generally speaking, the compression ratio of the traditional engine is not changeable. This is due to the fact that the design parameters of the total cylinder volume and combustion chamber volume are fixed and cannot be changed in the working process. It is known that increasing the compression ratio can improve the indicated thermal efficiency of the engine, improve the engine power, improve engine economy, improve engine emission performance, as well as improve the cold start performance of the engine. However, the oversized compression ratio will increase the engine's mechanical load, heat load and the possibility of detonation. In addition, the oversized compression ratio will also reduce the reliability and service life of the engine. Especially, when the turbocharger is used in the engine, the contradiction between the above two aspects is more prominent. This is mainly due to the fact that to prevent detonation, the compression ratio of the turbo-supercharged engine is lower than that of the naturally aspirated engine. In the actual operation of the turbo-supercharged engine, the turbocharging system begin to work only when the engine reaches a certain speed. This phenomenon is called "supercharging lag phenomenon". That is, under the condition of low engine speed, turbocharging system does not work. Therefore, compared with the natural aspirated engine, the torque rise of the turbo-supercharged engine is slow at low speed. This is mainly due to the fact that the compression ratio of turbocharged engine is lower than that of natural aspirated engine. However, under the condition of high engine speed, turbocharging system begin to work. With the increase of air intake, the volumetric efficiency is increased, giving a fast burning rate and thus high thermal efficiency and power output. This high combustion efficiency leads to the turbocharged engine cylinder more prone to detonation (also known as the "knock" phenomenon). In addition, the engine's mechanical load and heat load are increased, and the reliability of the engine is also very unfavorable. In order to solve the above contradiction of the compression ratio requirements on different working conditions (low engine speed and high engine speed), the invention has designed a variable compression ratio actuator for rotary engine, which can realize a continuous adjustment of the compression ratio for different working conditions. Therefore, the invention can ensure the best compression ratio from low engine speed to high engine speed in the whole operation range, which can overcome the defect of traditional rotary engine with an immutable compression ratio. From the above, the invention can improve the performance of rotary engine significantly.

CONTENTS OF THE INVENTION

In view of the defects in the existing technology, the invention provides a variable compression ratio actuator for rotary engine. According to the compression ratio requirements on the different working conditions, the invention can arbitrarily adjust the engine compression ratio to meet the above requirements. Therefore, the invention can make the rotary engine always work in the best compression ratio under different working conditions, and the performance of the rotary engine can be improved significantly.

To achieve the above technical purpose, the following technical means were used in the invention. The features of the invented actuator which can achieve different compression ratios for rotary engine, includes three parts: the eccentric shaft part, the triangle rotor part and the control system.

The eccentric shaft part which is described above, includes the front part of the eccentric shaft, the combination of electric three-jaw and the rear part of the eccentric shaft. The combination of electric three jaw which is described above, includes the end cap of the electric three-jaw and the electric three-jaw. The telescopic distance of the claw top of the electric three-jaw which is described above, is controlled by the control system. Each claw top of the electric three jaw which is described above, is fitted with the inner support arc block. The front part of the eccentric shaft and the rear part of the eccentric shaft which are described above, both have an eccentric circular table, respectively. The front part of the eccentric shaft which is described above, is provided with the second through hole, which is internally fixed with a wire which is used to control the electric three-jaw. The front part of the eccentric shaft, the combination of electric three-jaw and the rear part of the eccentric shaft which are described above, are fixedly connected through the second bolt. In addition, the above connection must ensure that the eccentric circular table of the front part of the eccentric shaft, is coaxial with the combination of electric three-jaw and the eccentric circular table of the rear part of the eccentric shaft.

The triangle rotor part which is described above, includes the variable volume actuator, the front part of the triangle rotor and the rear part of the triangle rotor. The outer surfaces of the front part and the rear part of the triangle rotor which are described above, both have a first opening, respectively. The front part of the rotor and the rear part of the triangle rotor which are described above, are fixedly connected through the first bolt to make the first opening of the front part of the triangle rotor align with the first opening of the rear part of the triangle rotor. The rotor pocket is formed by a combination of the first openings in the outer surfaces of the front part and the rear part of the triangle rotor. The front part and the rear part of the triangle rotor which are described above, both have a second opening, respectively. The through hole is formed by a combination of the second openings in the front part and the rear part of the triangle rotor. The interior of the rear part of the triangle rotor which are described above, is equipped with a first annular groove. The interior of the front part of the triangle rotor which are described above, is equipped with a second annular groove. The location and shape of the first annular groove and the second annular groove which are described above, are the same. The interior opening within the rotor is formed by a combination of the first annular groove and the second annular groove which are described above. The through hole is used to connect the rotor pocket and the interior opening within the rotor which are described above. The variable volume actuator described above, is installed in the interior opening within the rotor described above. The variable volume actuator described above, comprises of the variable volume plate and the outer support arc block. The connecting cylinder is used to connect the variable volume plate and the outer support arc block which are described above. One end of the extension spring is fixed on the variable volume plate described above, and the other end of the extension spring is fixed in the rotor pocket described above. The outer support arc block described above, is installed in the interior opening within the rotor described above.

The control system which is described above, includes the control system of electric three-jaw and the rotating joint. One end of the rotating joint described above, is connected with the wire in the second through hole. The other end of the rotating joint is connected with the wire of the control system of electric three jaw.

The expansion and contraction of the electric three-jaw described above, are controlled by the control system of electric three-jaw described above. The eccentric shaft part described above passes through the triangle rotor part described above, to make the combination of electric three-jaw to arrange in the interior opening within the rotor described above. The reciprocating motion of the variable volume actuator described above, is controlled by the expansion and contraction of the claw top of the electric three-jaw.

Further, the variable volume plate described above, is arranged with the seal groove. The seal groove described above, is equipped with the wave spring. The sealing strip which is used as a seal between the variable volume plate and the rotor pocket, is installed on the outside of the wave spring.

Further, the shape of the rotor pocket described above, is a square groove.

Further, the angle of the two ends of the outer support arc block is chamfered outwards, so that the outer arc length of the section of outer support arc block is longer than the inner arc length of the section of outer support arc block.

Further, the angle of the two ends of the inner support arc block is chamfered inwards, so that the outer arc length of the section of inner support arc block is shorter than the inner arc length of the section of inner support arc block.

The advantages of the invention are as follows:

The actuator of the present invention which can achieve variable compression ratios for rotary engine, can be controlled by the control system, to provide the optimal compression ratio according to the compression ratio requirements on the different working conditions. Therefore, the invention can make the rotary engine always work in the best compression ratio under different working conditions, and the performance of the rotary engine can be improved significantly.

The actuator of the present invention which can achieve variable compression ratios for rotary engine, gives a new design for the triangle rotor and the eccentric shaft of the traditional rotary engine. The new design realizes that the actuator can adjust the compression ratio for rotary engine, which can completely solve the existing defects of the existing traditional rotary engine which has a nonadjustable compression ratio.

Figure 1:
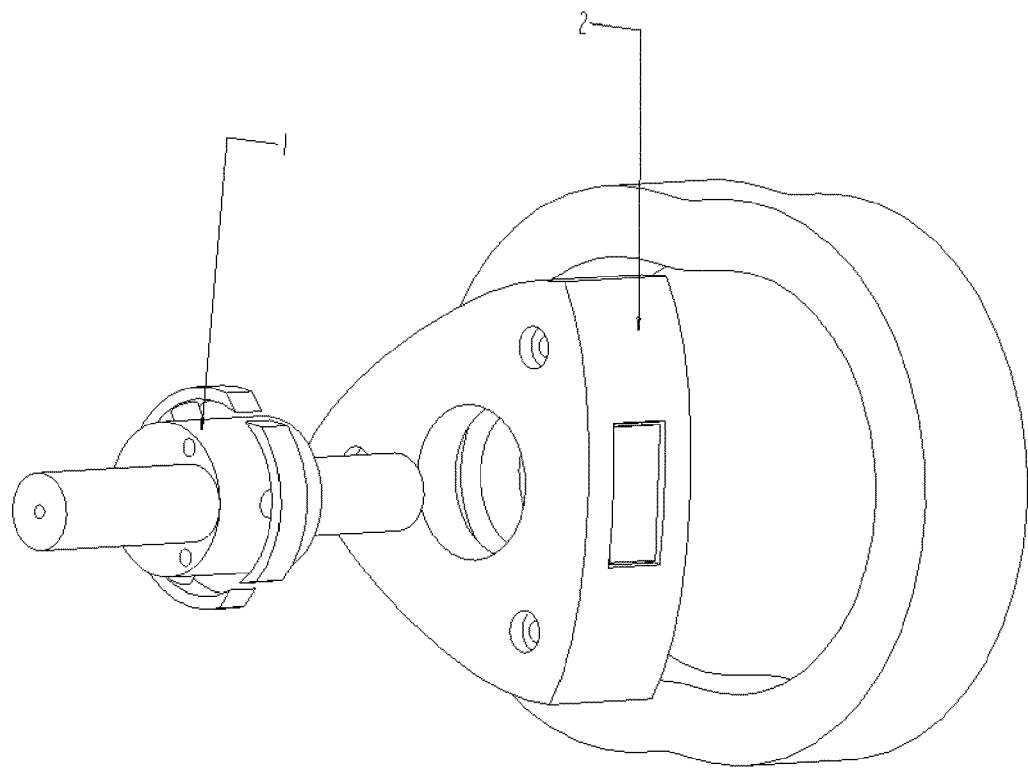
FIG. 1 is an assembly exploding diagram of the actuator which can realize different compression ratios of the rotary engine.
Figure 2:
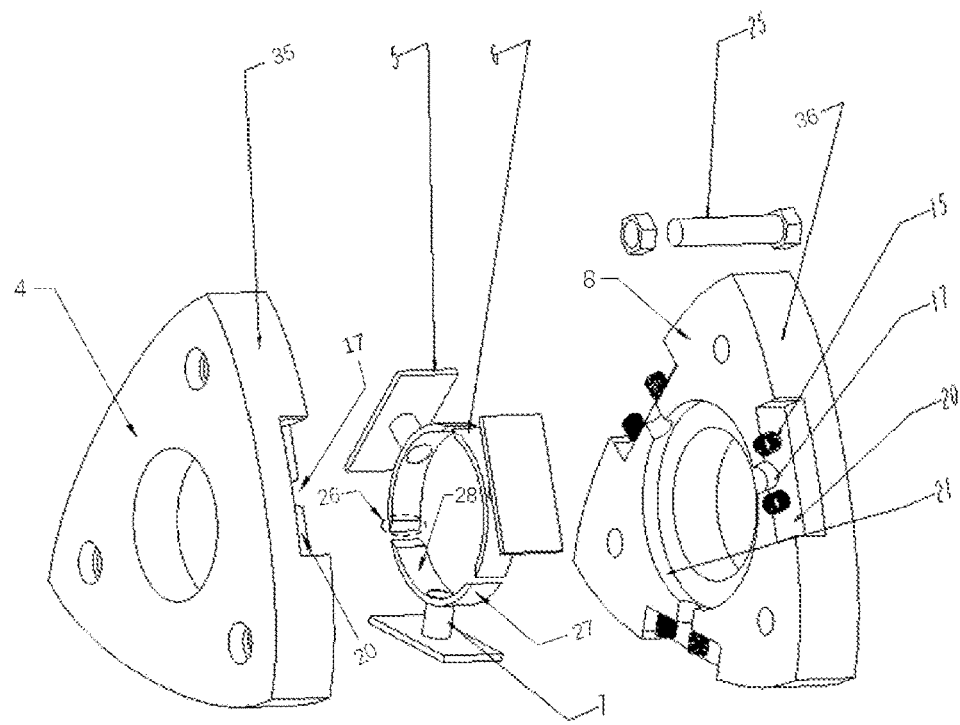
FIG. 2 is an assembly exploding diagram for the triangle rotor part described in the present invention.
Figure 3:
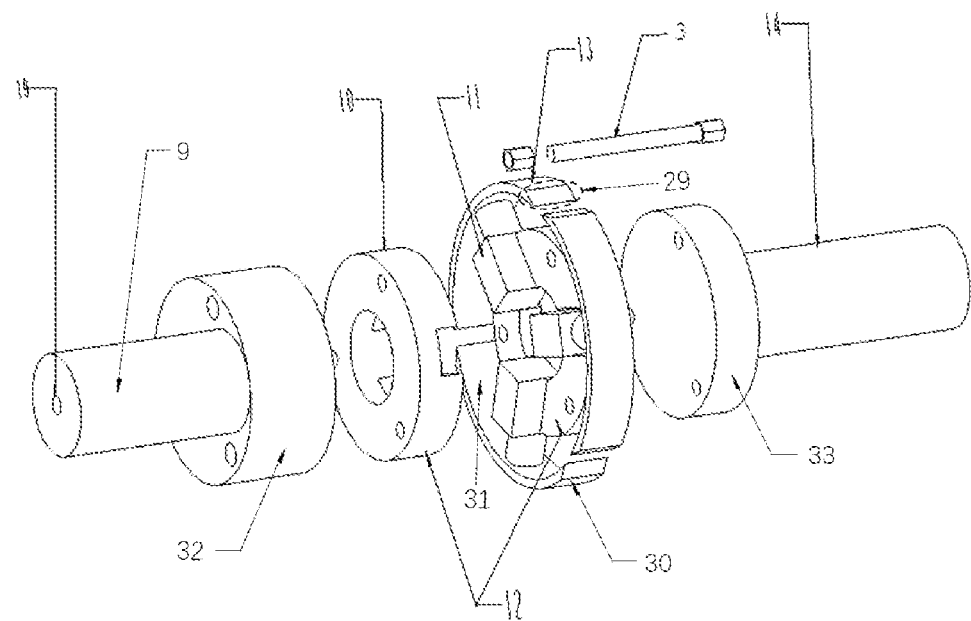
FIG. 3 is an assembly exploding diagram of the eccentric shaft part described in the present invention.

In the figures: 1—the eccentric shaft part; 2—the triangle rotor part; 3—the second bolt; 4—the front part of the triangle rotor; 5—the variable volume plate; 6—the outer support arc block; 7—the connecting cylinder; 8—the rear part of the triangle rotor; 9—the front part of the eccentric shaft; 10—the end cap of the electric three-jaw; 11—electric three-jaw; 12—the combination of electric three-jaw; 13—the inner support arc block; 14—the rear part of the eccentric shaft; 15—the extension spring; 16—the rotating joint; 17—the second opening; 18—the control system of electric three jaw; 19—the second through hole; 20—the first opening; 21—the first annular groove; 22—the seal groove; 23—the wave spring; 24—the sealing strip; 25—the first bolt; 26—the angle which is chamfered outwards; 27—the outer arc length of a section of the outer support arc block 6; 28—the inner arc length of the section of the outer support arc block 6; 29—the angle which is chamfered inwards; 30—the outer arc length of a section of inner support arc block 13; 31—the inner arc length of the section of inner support arc block 13; 32—the eccentric circular table of the front part of the eccentric shaft 9; 33—the eccentric circular table of the rear part of the eccentric shaft 14; 34—the wire passing through the second through hole 19; 35—the outer surfaces of the front part of the triangle rotor 4; 36—the outer surface of the rear part of the triangle rotor 8.

Embodiments

Hereunder the embodiments of the present invention will be described in detail with reference to the accompanying drawings.

Combining FIG. 1, FIG. 2, FIG. 3 and FIG. 7, the actuator which can achieve different compression ratios for rotary engine, includes three parts: the eccentric shaft part 1, the triangle rotor part 2 and the control system.

The eccentric shaft part 1 which is described above, includes the front part of the eccentric shaft 9, the combination of electric three-jaw 12 and the rear part of the eccentric shaft 14. The combination of electric three-jaw 12 which is described above, includes the end cap of the electric three-jaw 10 and the electric three-jaw 11. The telescopic distance of the claw top of the electric three jaw 11 is controlled by the electric three-jaw 11, by using the control system described above. Each claw top of the electric three-jaw 11 which is described above, is fitted with the inner support arc block 13. The front part of the eccentric shaft 9 has an eccentric circular table 32. The rear part of the eccentric shaft 14 has an eccentric circular table 33. The front part of the eccentric shaft 9, is provided with the second through hole 19, which is internally fixed with a wire 34 which is used to control the electric three-jaw 11. The front part of the eccentric shaft 9, the combination of electric three-jaw 12 and the rear part of the eccentric shaft 14, are fixedly connected through the second bolt 3. In addition, the above connection ensures that the eccentric circular table 32 of the front part of the eccentric shaft 9, is coaxial with the combination of electric three-jaw 12 and the eccentric circular table 33 of the rear part of the eccentric shaft 14.

The triangle rotor part 2 which is described above, includes the variable volume actuator, the front part of the triangle rotor 4 and the rear part of the triangle rotor 8. The shapes of the front part of the triangle rotor 4 and the rear part of the triangle rotor 8 are the same. The outer surface 35 of the front part of the triangle rotor 4 and the outer surface 36 of the rear part of the triangle rotor 8 which are described above, both have the first opening 20. The front part of the triangle rotor 4 and the rear part of the triangle rotor 8 which are described above, both have the second opening 17. The interior of the rear part of the triangle rotor 8 which are described above, is equipped with a first annular groove 21. The interior of the front part of the triangle rotor 4 which are described above, is equipped with a second annular groove (Not shown in the accompanying drawings). The location and shape of the first annular groove 21 and the second annular groove which are described above, are the same. The second opening 17 of the rear part of the triangle rotor 8 is used to connect the first opening 20 of the rear part of the triangle rotor 8 and the first annular groove 21 which are described above. The second opening 17 of the front part of the triangle rotor 4 is used to connect the first opening 20 of the front part of the triangle rotor 4 and the second annular groove (Not shown in the accompanying drawings) which are described above. The front part of the triangle rotor 4 and the rear part of the triangle rotor 8, are fixedly connected through the first bolt 25 to make the first opening 20 of the front part of the triangle rotor 4 align with the first opening 20 of the rear part of the triangle rotor 8. The rotor pocket is formed by a combination of the first opening 20 in the outer surface 35 of the front part of the triangle rotor 4 and the first opening 20 in the outer surface 36 of the rear part of the triangle rotor 8. The shape of the rotor pocket, is a square groove. The through hole is formed by a combination of the second opening 17 in the front part of the triangle rotor 4 and the second opening 17 in the rear part of the triangle rotor 8. The interior opening within the rotor is formed by a combination of the first annular groove 21 in the rear part of the triangle rotor 8 and the second annular groove (Not shown in the accompanying drawings) in the front part of the triangle rotor 4. The through hole is used to connect the rotor pocket and the interior opening within the rotor which are described above. The variable volume actuator described above, is installed in the interior opening within the rotor. The variable volume actuator described above, comprises of the variable volume plate 5 and the outer support arc block 6. The connecting cylinder 7 is used to connect variable volume plate 5 and the outer support arc block 6. One end of the extension spring 15 is fixed on variable volume plate 5, and the other end of the extension spring 15 is fixed in the rotor pocket. The outer support arc block 6, is installed in the interior opening within the rotor.

The control system which is described above, includes the control system of electric three-jaw 18 and the rotating joint 16. One end of the rotating joint 16 described above, is connected with the wire 34 in the second through hole 19. The other end of the rotating joint 16 is connected with the wire of the control system of electric three-jaw 18. The expansion and contraction of the electric three-jaw 11, are controlled by the control system of electric three-jaw 18.

The eccentric shaft part 1 described above, passes through the triangle rotor part 2, to make the combination of electric three-jaw 12 to arrange in the interior opening within the rotor. The reciprocating motion of the variable volume actuator described above, is controlled by the expansion and contraction of the claw top of the electric three-jaw 11.

As the wire 34 in the second through hole 19 connects to the electric three-jaw 11, the wire 34 in the second through hole 19 and the eccentric shaft part 1, do rotational motion together in the actual working process of the rotary engine. Therefore, the wire 34 in the second through hole 19 uses hard wire. In addition, the wire 34 in the second through hole 19 is linked to the control system of electric three-jaw 18, by using the rotating joint 16. The above method can prevent the torsion of the wire 34 in the second through hole 19, which protects the normal operation of the control system of electric three jaw 18.

The specific work process is as follows:

According to the compression ratio requirements on the different working conditions, the expansion and contraction of the electric three-jaw 11 are controlled by the control system of electric three jaw 18. When the compression ratio needs to be increased, the electric three jaw 11 is extended. The motion of the variable volume actuator is driven by the inner support arc block 13, to reduce the volume of the rotor pocket which is used as a part of combustion chamber. When the compression ratio needs to be decreased, the electric three-jaw 11 is contracted. At the same time, the variable volume actuator is pulled back by the extension spring 15 which is fixed in the rotor pocket, to increase the volume of the rotor pocket which is used as a part of combustion chamber.

Figure 4:
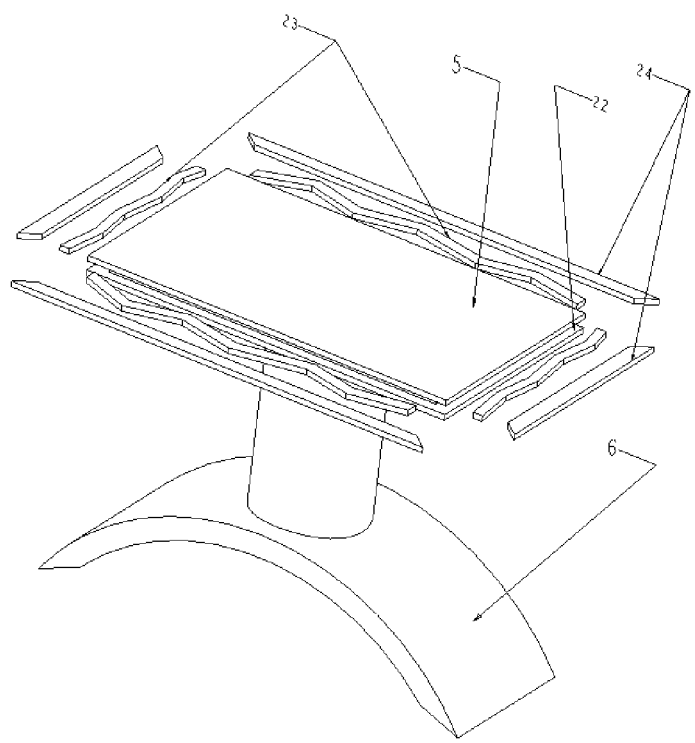
FIG. 4 is a schematic diagram of the principle of sealing on the variable volume plate.
Figure 5:
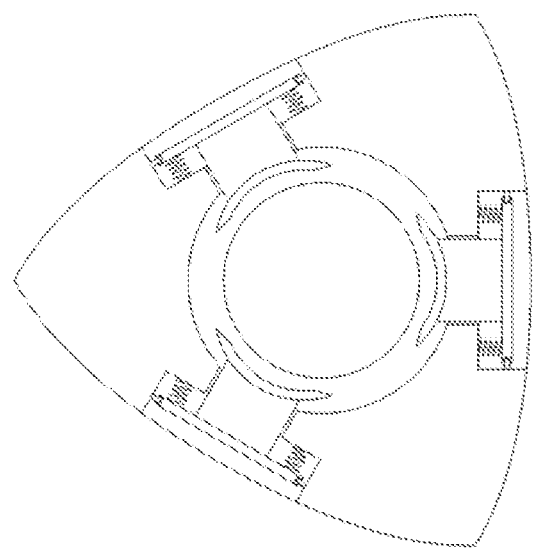
FIG. 5 is the layout of the variable volume actuator in the triangle rotor.

As there is a reciprocating motion of the variable volume plate 5 in the rotor pocket, there is a need to take measures to ensure the seal between the variable volume plate 5 and the rotor pocket. The surroundings of the variable volume plate 5, as shown in FIG. 4 and FIG. 5 is arranged in the seal groove 22. The seal groove 22 described above, is equipped with the wave spring 23. The sealing strip 24 which is used as a seal between the variable volume plate 5 and the rotor pocket, is installed on the outside of the wave spring 23.

Figure 6:
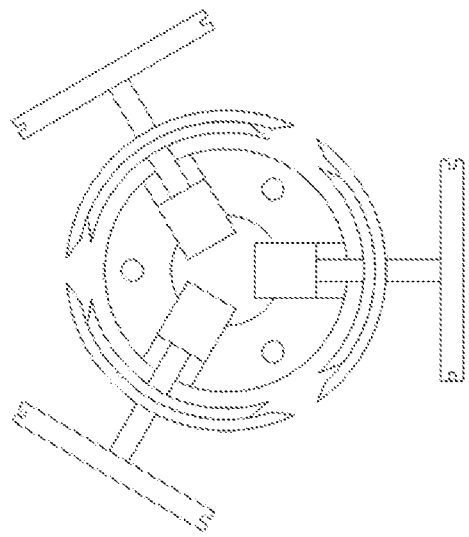
FIG. 6 is a collaboration diagram of the variable volume actuator and the electric three-jaw described in the present invention.
Figure 7:
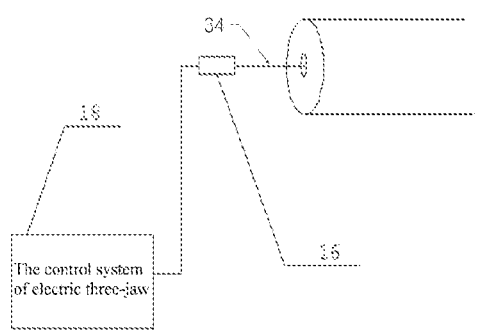
FIG. 7 is a schematic diagram of the control system described in the present invention.

As shown in FIG. 6, in the working process of the rotary engine, the rotational speed of the eccentric shaft and the rotational speed of the triangle rotor are different. Therefore, although the inner support arc block 13 and the outer support arc block 6 are always stuck together, there is a relative rotation motion. In order to prevent the movement interferences between the inner support arc block 13 and the outer support arc block 6, the angle 26 of the two ends of the outer support arc block 6 is chamfered outwards, so that the outer arc length 27 of the section of outer support arc block 6 is longer than the inner arc length 28 of the section of outer support arc block 6. In addition, the angle 29 of the two ends of the inner support arc block 13 is chamfered inwards, so that the outer arc length 30 of the section of inner support arc block 13 is shorter than the inner arc length 31 of the section of inner support arc block 13.

The embodiments of the invention described above, is the preferred implementation method. However, the invention is not restricted to the embodiments of the invention described above. Without deviating from the essential content of the invention, any visible improvement, replacement or modification made by the technical staff in the field, is all within the scope of protection of the invention.

The invention claimed is:

1. An actuator for a rotary engine comprising:
   an eccentric shaft comprising an electric three-jaw having first, second, and third claw tops each connected to a respective first, second, and third inner support arc blocks;
   a triangle rotor comprising:
      a rotor pocket formed in an outer surface of the triangle rotor,
      an interior opening within the rotor, and
      a through hole connecting the rotor pocket and the interior opening;
   a variable volume actuator comprising a variable volume plate and an outer support arc block, wherein:
      the variable volume plate is located within the rotor pocket,
      the outer support arc block is located within the interior opening,
      the variable volume plate and the outer support arc block are fixedly connected to one another by a connecting cylinder that extends through the through hole,
      the variable volume actuator is configured to telescopically move with respect to the rotor; and
   a control system configured to control expansion and contraction of the electric three-jaw based on electrical signals received at the control system through a wire passing through the eccentric shaft, causing movement of the first, second, and third claw tops and their corresponding respective first, second, and third inner support arc blocks to actuate the variable volume actuator such that the variable volume plate moves within the rotor,
   wherein when the actuator is used in the rotary engine, movement of the variable volume plate within the rotor pocket achieves different compression ratios for the rotary engine, further wherein the variable volume plate is arranged with a seal groove comprising a wave spring and a sealing strip installed on an outside of the wave spring to form a seal between the variable volume plate and the rotor pocket.

2. The actuator for a rotary engine of claim 1, wherein a shape of the rotor pocket is a square groove.

3. The actuator for a rotary engine of claim 1, wherein an angle of each of two ends of the outer support arc block are chamfered outwards, so that an outer arc length of a section of the outer support arc block is longer than an inner arc length of the section of the outer support arc block.

4. The actuator for a rotary engine of claim 1, wherein an angle of each of two ends of the inner support arc block are chamfered inwards, so that an outer arc length of a section of inner support arc block is shorter than an inner arc length of the section of inner support arc block.

5. The actuator for a rotary engine of claim 1, wherein:
   the eccentric shaft further comprises a front part and a rear part each having an eccentric circular table; and
   the front part comprises a second through hole having the wire passing therethrough.

6. The actuator for a rotary engine of claim 5, wherein the eccentric circular table of the front part of the eccentric shaft is coaxial with the electric three-jaw and the eccentric circular table of the rear part of the eccentric shaft.

7. The actuator for a rotary engine of claim 1, wherein the triangle rotor comprises a front part and a rear part fixedly connected by a bolt, and further wherein the interior opening within the rotor is formed by a first annular groove in the front part and a second annular groove in the rear part.

8. The actuator for a rotary engine of claim 7, wherein the rotor pocket is formed by a combination of first openings in the outer surfaces of the front part and the rear part of the triangle rotor, and further wherein the through hole is also formed by a combination of second openings between the first openings and the first and second annular grooves.

9. The actuator for a rotary engine of claim 1, further comprising at least one extension spring connected to the variable volume plate and a surface of the rotor pocket.

* * * * *